(12) United States Patent
Stine et al.

(10) Patent No.: US 9,275,195 B1
(45) Date of Patent: Mar. 1, 2016

(54) INTERMEDIATED RIGHTS MANAGEMENT

(75) Inventors: Dan Stine, Arlington, MA (US); Keith Meyer, Southborough, MA (US)

(73) Assignee: COPYRIGHT CLEARANCE CENTER, INC., Danvers, MA (US)

( * ) Notice: Subject to any disclaimer, the term of this patent is extended or adjusted under 35 U.S.C. 154(b) by 997 days.

(21) Appl. No.: 12/709,030

(22) Filed: Feb. 19, 2010

(51) Int. Cl.
  *G06Q 20/00* (2012.01)
  *G06F 21/00* (2013.01)

(52) U.S. Cl.
  CPC ........................................ *G06F 21/00* (2013.01)

(58) Field of Classification Search
  CPC .......................................................... G06F 21/00
  USPC .......................................................... 705/59
  See application file for complete search history.

(56) References Cited

U.S. PATENT DOCUMENTS

| | | | | |
|---|---|---|---|---|
| 6,006,332 | A * | 12/1999 | Rabne et al. | 726/6 |
| 6,496,802 | B1 * | 12/2002 | van Zoest et al. | 705/14.73 |
| 7,748,030 | B1 * | 6/2010 | Selberg | 705/59 |
| 7,818,262 | B2 * | 10/2010 | Kavuri et al. | 705/59 |
| 8,103,593 | B2 * | 1/2012 | Kim | 705/59 |
| 2001/0010045 | A1 * | 7/2001 | Stefik | G06F 21/10 705/51 |
| 2003/0126086 | A1 * | 7/2003 | Safadi | G06F 21/10 705/51 |
| 2004/0158731 | A1 * | 8/2004 | Narin et al. | 713/200 |
| 2004/0249653 | A1 * | 12/2004 | Le et al. | 705/1 |
| 2005/0004873 | A1 * | 1/2005 | Pou et al. | 705/51 |
| 2007/0100763 | A1 * | 5/2007 | Kim | 705/59 |
| 2007/0198429 | A1 * | 8/2007 | Coley | G06F 21/10 705/59 |
| 2007/0250194 | A1 * | 10/2007 | Rhoads et al. | 700/94 |
| 2008/0114688 | A1 * | 5/2008 | Martinez et al. | 705/51 |
| 2008/0140433 | A1 * | 6/2008 | Levy et al. | 705/1 |
| 2008/0140640 | A1 * | 6/2008 | Raff | H04L 29/06 |
| 2008/0249946 | A1 * | 10/2008 | Candelore | 705/59 |
| 2009/0151000 | A1 * | 6/2009 | Okamoto et al. | 726/26 |
| 2010/0161499 | A1 * | 6/2010 | Holcombe et al. | 705/310 |
| 2010/0217974 | A1 * | 8/2010 | Fujimoto et al. | 713/155 |

FOREIGN PATENT DOCUMENTS

JP        2002297945 A   * 10/2002

* cited by examiner

*Primary Examiner* — James A Reagan
(74) *Attorney, Agent, or Firm* — Kriegsman & Kriegsman

(57) ABSTRACT

One customer of the license clearinghouse may act as an intermediary and perform selected tasks on behalf of another customer. In particular, an intermediary customer can make rights inquiries that access the portion of the central repository that belongs to its client in order to determine rights available to the client. In one embodiment, the portion of the central repository that is accessed in response to a rights inquiry is determined by an IP address of the device being used to make the rights inquiry. This IP address is used to retrieve a record having a customer ID and a field that indicates whether the IP address corresponds to a rights intermediary. If this is the case, a keyword corresponding to the customer ID of the customer that is provided in the rights request by the rights intermediary is used to access the central repository.

7 Claims, 3 Drawing Sheets

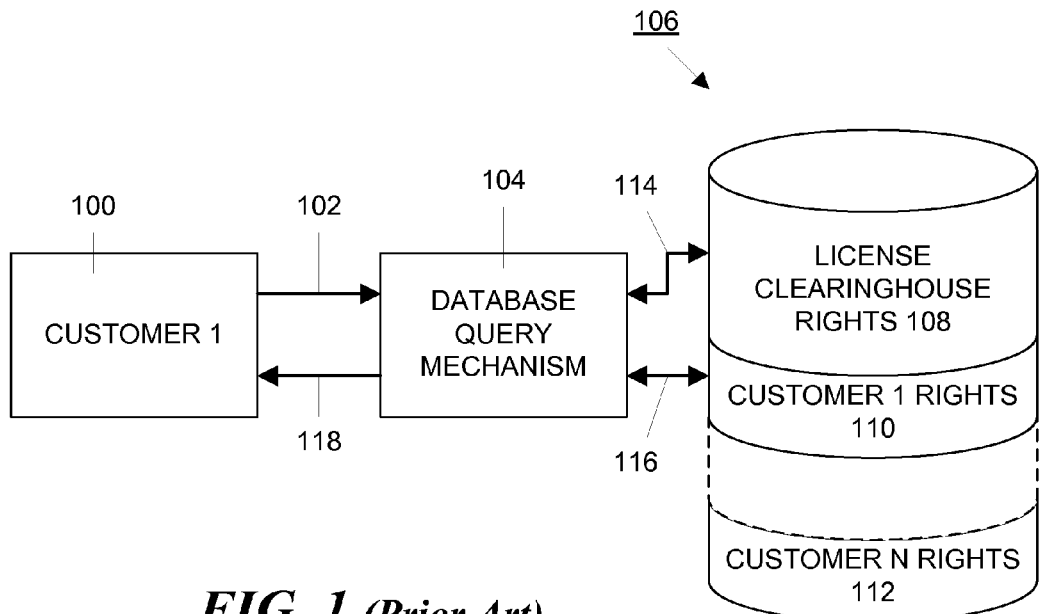
FIG. 1 *(Prior Art)*
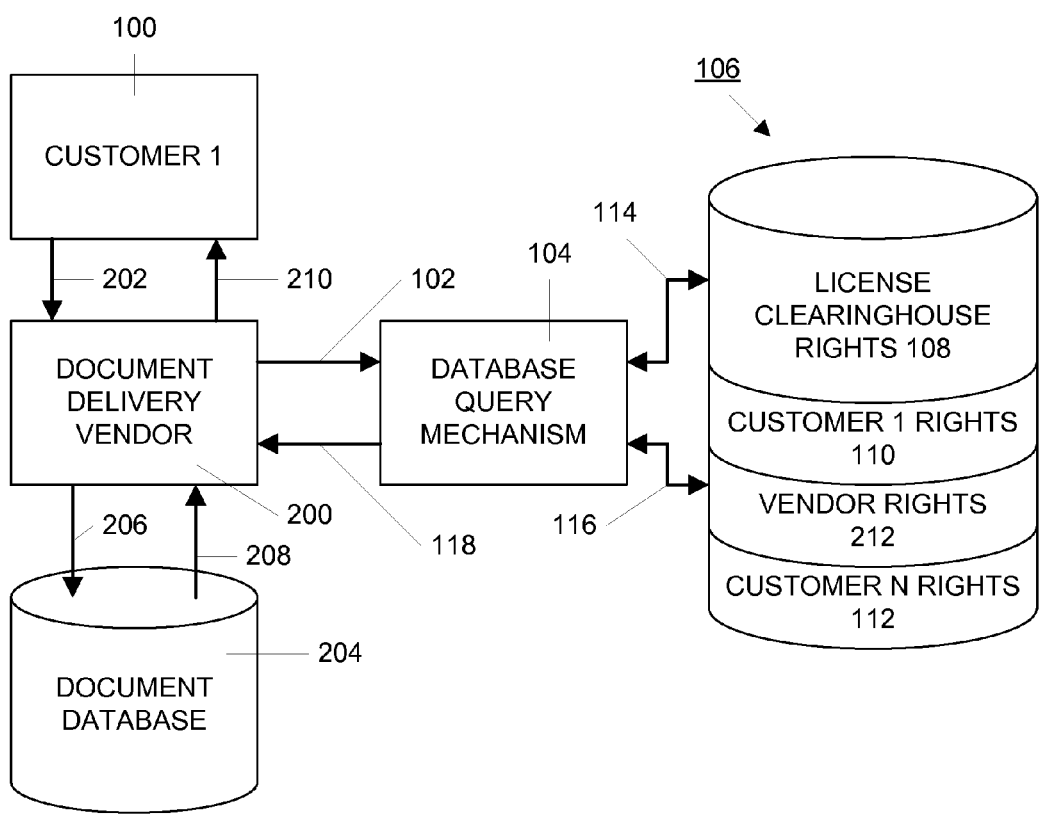
FIG. 2 *(Prior art)*

INTERMEDIATED RIGHTS MANAGEMENT

BACKGROUND

This invention relates to library services and methods and apparatus for managing reuse rights for content. Works, or "content", created by an author is generally subject to legal restrictions on reuse. For example, most content is protected by copyright. In order to conform to copyright law, content users often obtain content reuse licenses. A content reuse license is actually a "bundle" of rights, including rights to present the content in different formats, rights to reproduce the content in different formats, rights to produce derivative works, etc. Thus, depending on a particular reuse, a specific license for that reuse may have to be obtained.

Many organizations use content for a variety of purposes, including research and knowledge work. These organizations obtain the content and the rights to reuse that content through many vendors, including publishers and subscription resellers. Due to the number of vendors and rights involved, these organizations often additionally engage the services of a license clearinghouse to obtain and manage these rights. The license clearinghouse, in turn, has a central repository that it maintains on behalf of multiple organizations. For each organization, the central repository includes license rights acquired from the license clearinghouse and license rights acquired through direct negotiations with vendors. Additionally, even though there is a central repository, many organizations maintain their own virtual database that allows them to manage their own rights.

In order to determine whether a reuse right for a particular content item has been previously purchased and is therefore available or whether it must be newly purchased, a member of an organization must check the virtual database and, if the right is not there, make a right request either directly to a vendor who provides the content item or to the license clearinghouse. Individual vendors can provide a higher level of service value if they are aware of the rights that an organization has previously acquired. For example, assuming that a member of an organization requests a copy of a content item from a vendor, if that vendor is aware that the organization has already acquired a right to an original of the content item, the vendor can charge a fee appropriate for a content item copy rather than a fee for an original content item. Similarly, if the vendor is aware that the organization has acquired a right to an original content item together with rights to share that content item in specified format, the vendor can provide a copy of the content item in the specified format without charge. In another scenario, if a vendor is aware that an organization has not acquired access to an original content item, but does have rights to share the item in given format, the vendor can provide access to original free of digital rights management restrictions because copying of the content item is allowed. Another way vendor can provide a higher service level is by indicating available rights and permissions when the content item is provided to the client.

However, in order to be aware of all of the rights that an organization has previously acquired, a vendor must access the license clearinghouse database. While many vendors are themselves customers of the license clearinghouse services, each customer is only allowed to access the portion of the central repository that belongs to it. Therefore, a vendor cannot access the portion of the central repository that belongs to its client.

SUMMARY

In accordance with the principles of the invention, one customer of the license clearinghouse may act as an intermediary and perform selected tasks on behalf of another customer. In particular, an intermediary customer can make rights inquiries that access the portion of the central repository that belongs to its client in order to determine rights available to the client.

In one embodiment, the portion of the central repository that is accessed in response to a rights inquiry is determined by an IP address of the device being used to make the rights inquiry. This IP address is used to retrieve a record having a customer ID, which is in turn used to access the central repository. In accordance with the invention, the record has a field that indicates whether the IP address corresponds to a rights intermediary. If this is the case, a keyword corresponding to the customer ID of the customer that is provided in the rights request by the rights intermediary is used to access the central repository.

In another embodiment, the central repository has a database that stores pairs of ID values and, in response to a rights inquiry, this database is searched to determine if it has an ID value pair including the customer ID identifying the rights intermediary and a customer ID corresponding to a keyword provided by the rights intermediary with the rights request.

BRIEF DESCRIPTION OF THE DRAWINGS

FIG. 1 is a block schematic diagram illustrating the conventional mechanism involved when a customer accesses the central repository to retrieve rights available for a selected content item.

FIG. 2 is a block schematic diagram illustrating the conventional mechanism involved when a customer requests a content item from a vendor.

DETAILED DESCRIPTION

Figure 3:
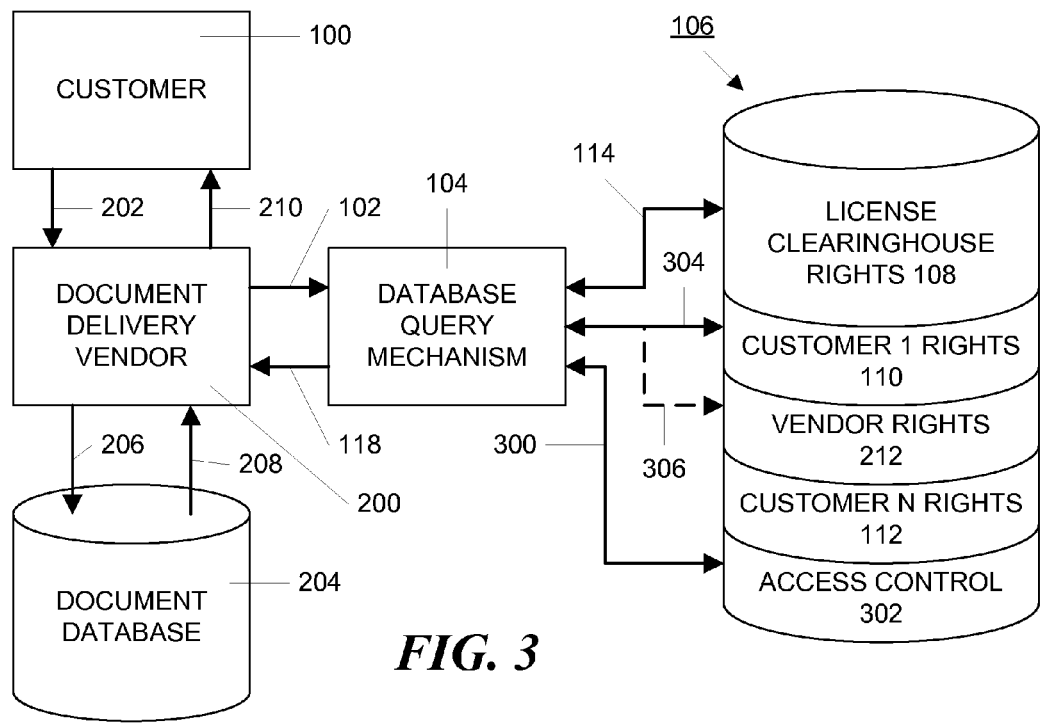
FIG. 3 is a block schematic diagram illustrating the mechanism involved when a customer requests a content item from a vendor in accordance with the principles of the invention.

FIG. 1 illustrates the operation of the conventional mechanism when a customer accesses a central repository maintained by a license clearinghouse. Customer 100 initiates a rights request 102 typically by accessing a web site maintained by the license clearinghouse and making a web access request. In the process of making this web access request, the customer typically provides a content item ID that identifies the content item for which license rights are requested. The web service used to access the central repository also sends the IP address of the device from which the request originated.

The request is received by a database query mechanism 104 that, for example, may comprise software running in a server at the location of the central repository data storage area of which central repository data storage 106 is shown. The database query mechanism 104 accesses the central repository 106 and retrieves license rights found therein. As previously mentioned, the central repository 106 is divided into sections. Typically, one section 108 contains license rights provided by the license clearinghouse. Other sections contain license rights that have been obtained by customers via direct negotiations with vendors. Two of these sections 110 and 112 are shown for customers 1 and N, respectively.

In response to the rights request, the database query mechanism queries the license clearinghouse section 108 of the central repository as indicated schematically by arrow 114 and also accesses the section belonging to customer 1, if any as indicated schematically by arrow 116. The results of these two queries are combined and returned to the customer 100 as indicated by arrow 118.

FIG. 2 illustrates the operation of the conventional mechanism when a customer accesses the central repository via a third party vendor. In this case, the customer 100 initiates a document request to a document delivery vendor 200 as indicated by arrow 202. The document delivery vendor maintains a document database 204 that contains electronic copies of documents. In response to the customer request 202, the document delivery vendor 200 accesses the document database 204 as indicated by arrow 206 and retrieves a copy of the requested document.

The document delivery vendor may also make a rights request 102 to the central repository of the license clearinghouse 106. In response to the rights request, the database query mechanism queries the license clearinghouse section 108 of the central repository as indicated schematically by arrow 114. However, since the IP address provided by the vendor to the database query mechanism 104 belongs to one of the vendor devices instead of one of the customer devices, the database query mechanism 104 accesses the repository section 212 belonging to the vendor as indicated schematically by arrow 116 instead of the section 110 belonging to customer 1. The results of these two queries are combined and returned to the vendor 200 as indicated by arrow 118. Consequently, the license rights belonging to the client in repository section 212 are never accessed and the vendor 200 may charge the customer more than is necessary.

FIG. 3 illustrates how the prior art mechanism is modified in accordance with the principles of the invention. In this case, as in the previous case, the customer 100 initiates a document request to a document delivery vendor 200 as indicated by arrow 202 and the document delivery vendor 200 accesses the document database 204 as indicated by arrow 206 and retrieves a copy of the requested document.

Also, as before, the document delivery vendor makes a rights request 102 to the central repository of the license clearinghouse 106. However, in accordance with the principles of the invention, the rights request made by the document delivery vendor includes an additional parameter that identifies customer 100. In response to this rights request, the database query mechanism queries the license clearinghouse section 108 of the central repository as indicated schematically by arrow 114. However, in response to the additional parameter, the database query mechanism 104 accesses the access control repository section 302 as schematically indicated by arrow 300. From the information in the access control repository section 302, the database query mechanism determines that the document delivery vendor 200 can act as a rights intermediary and request information belonging to another customer; specifically, the customer identified by the additional parameter. Accordingly, the database query mechanism accesses the repository section 110 belonging to customer 100 as indicated by arrow 304. The database query mechanism may also optionally access the repository section 212 belonging to the vendor 200 as indicated schematically by dotted arrow 306. Consequently, the vendor 200 obtains all license rights needed to make an informed decision as to the charges involved in the document request based on the rights available to their end-customer.

Figure 4:
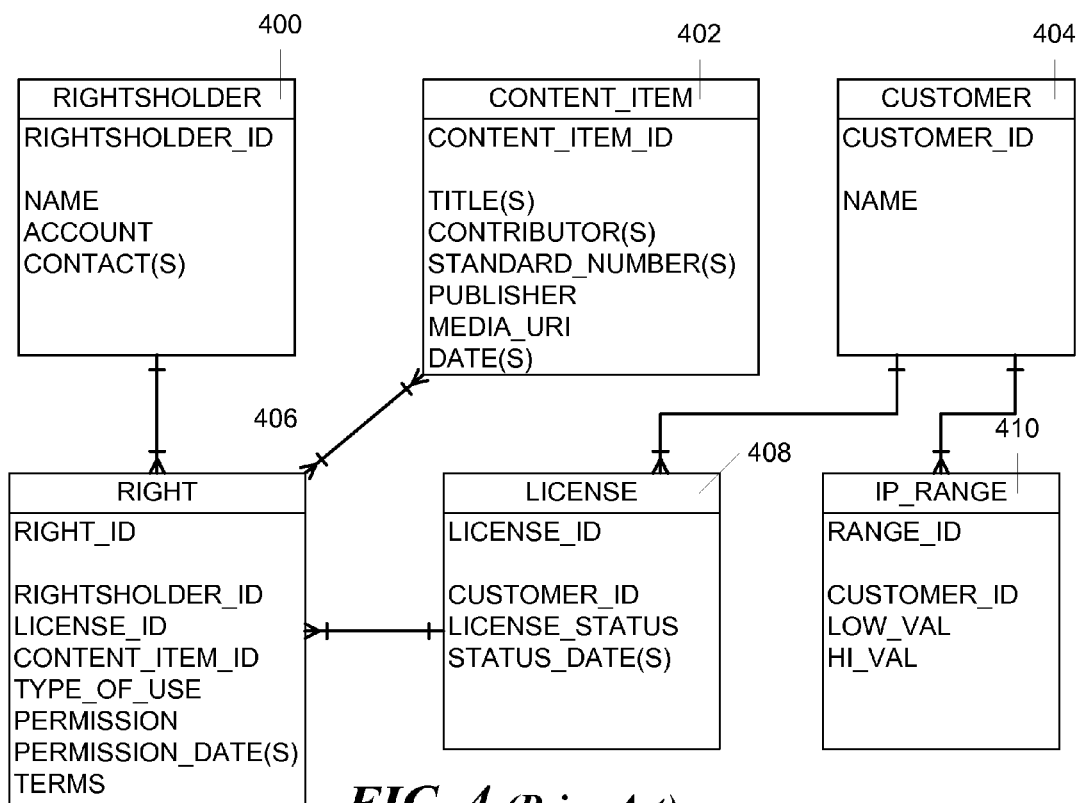
FIG. 4 is a table relation diagram showing conventional tables for storing customer and license information and table relations.

FIG. 4 shows an illustrative arrangement of data structures used by the database query mechanism 104 in one embodiment to implement a response to a rights request. FIG. 4 illustrates six interrelated tables, including a rights holder table 400, a content item table 402, a customer table 404, a right table 406, a license table 408 and an IP range table 410. Each table includes a primary key that uniquely identifies each record in the table. For example, the customer table 404 has a customer_ID primary key. The primary keys are shown separated as the first entry in the body of the table. Additional fields are also shown in which the content of the field is evident from the field name. The tables also include foreign keys that relate the tables in a manner well-known to those skilled in the art. For example, the license table 408 is related to the customer table 404 by the customer_ID key which is a foreign key in table 408. In a similar manner, each customer in the customer table 404 has related IP address values in IP_range table 410.

The interrelated tables shown in FIG. 4 are used by the database query mechanism 104 to process a request in the following manner. As previously mentioned, a license request includes a content_item_id indicating the content for which the license is requested and the IP address of the requesting device. The IP address is used by the database query mechanism to search the IP_range table 410. If the IP address falls within one of the stored address ranges, the corresponding customer_id value is extracted. The customer_id value is used to search the license table 408 to identify licenses available to the customer and the content_item_id, combined with the list of available licenses, is used to search the right table 406 to identify rights provided by the applicable licenses for a particular piece of content. The rights request query then returns a permission availability status, and related terms and rightsholder information.

Figure 5:
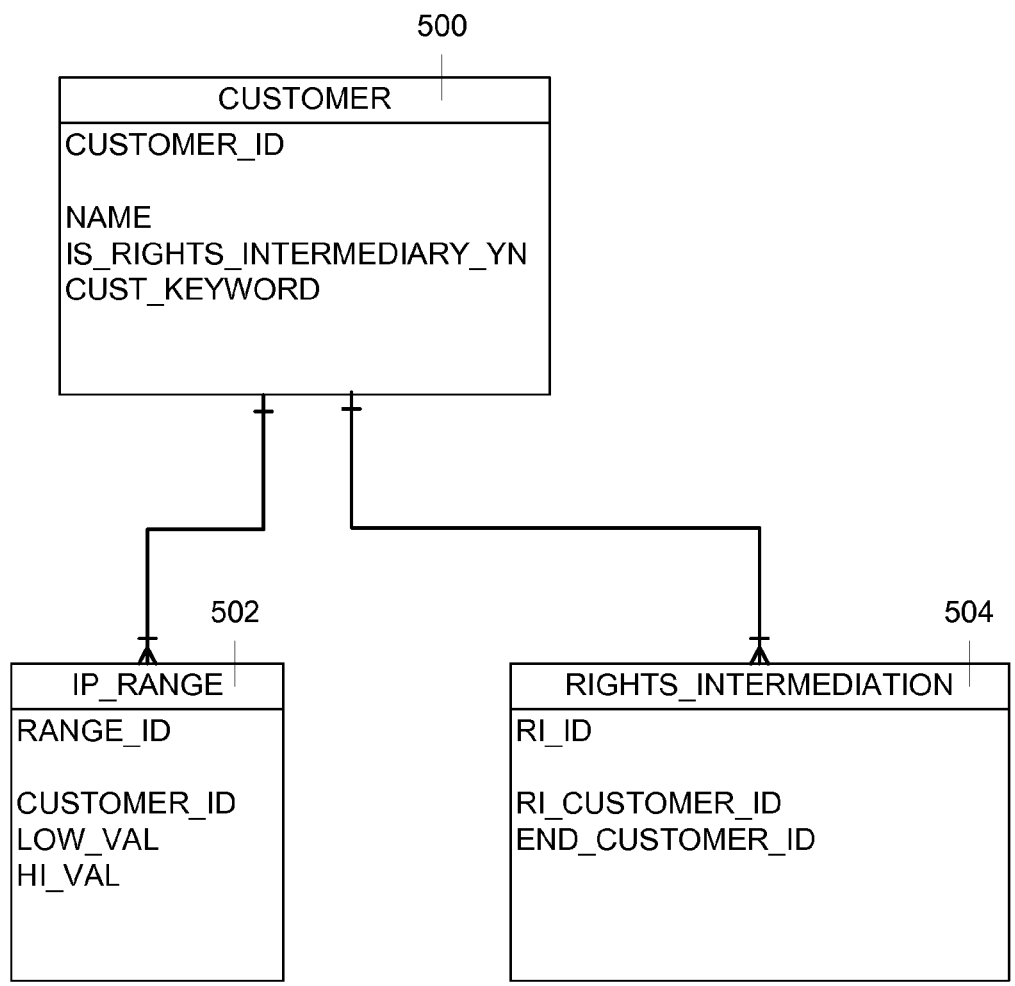
FIG. 5 is a table relation diagram showing modifications to the conventional tables to enable an intermediated rights request in accordance with the principles of the present invention.

FIG. 5 shows modifications made to the table structures shown in FIG. 4 in order to accommodate operation in accordance with the principles of the invention. In particular, a modified customer table 500 incorporates a new is_rights_intermediary_yn field. This field is used to indicate that the associated customer can act as an intermediary for other customers. In addition, a new rights_intermediation table 504 is included in the table structure. The rights_intermediation table includes records which have an ri_customer_id value and an end_customer_id value and is used to indicate the customers on behalf of which a given intermediary can act.

The processing of a license rights request with the modified data structure proceeds as follows. The IP address in the license request is used by the database query mechanism to search the IP_range table 502. If the IP address falls within one of the stored address ranges, the corresponding customer_id value is extracted. The is_rights_intermediary_yn field is then checked and if the value is "true" then the customer_id value is designated as the ri_customer_id. The value of the keyword in the request is used to search the customer table 500, and if a record is found, the customer_id value is designated as the end_customer_id. The two designated values are then used to access the rights_intermediation table 504. The presence of a record with both values indicates that the rights intermediary can act as an intermediary for the customer identified by the keyword. In this case, the end_customer_id field value from the rights_intermediation table 504 is used to search the license table 408 to identify licenses available to the customer. The content_item_id, combined with the list of available licenses, is used to search the right table 406 to identify the rights the applicable licenses provide for a particular piece of content. The rights request query then returns a permission availability status, and related terms and rightsholder information.

While the invention has been shown and described with reference to a number of embodiments thereof, it will be recognized by those skilled in the art that various changes in form and detail may be made herein without departing from the spirit and scope of the invention as defined by the appended claims.

What is claimed is:

1. A method for permitting a rights vendor, using a requesting compute device having a first IP address, to search for license rights on behalf of a customer in a central repository, the customer having a compute device with a second IP address that is distinct from the first IP address for the requesting compute device, the central repository being divided into a plurality of distinct sections which can be individually searched, wherein one of the plurality of sections of the central repository relating to license rights utilizes the first IP address associated with the requesting compute device for authentication purposes, the method comprising executing database query software to control a processor in a server at the central repository that is separate from the requesting compute device:

(a) to receive, under control of the processor in the server, a request from the requesting compute device of the rights vendor for license rights in the central repository that are associated with the customer, the request for license rights including the first IP address of the requesting compute device, and a keyword containing a customer ID identifying the particular customer;

(b) in response to receiving the request for license rights, to verify by the processor in the server that the first IP address for the requesting compute device belongs to a rights vendor authorized to access license rights in the central repository;

(c) when it is verified in step (b) that the first IP address of the requesting compute device belongs to a rights vendor that is authorized to access license rights in the central repository, to determine by the processor in the server whether the rights vendor is authorized to issue a rights request on behalf of the particular customer; and (d) when it is determined in step (c) that the rights vendor is authorized to issue a rights request on behalf of the particular customer, using the processor in the server to search the central repository for license rights with the customer ID contained in the keyword to yield a license rights search result that is delivered to the requesting compute device of the rights vendor.

2. The method of claim 1 wherein, in step (b), the processor uses the first IP address to retrieve from the central repository a record having a field that indicates whether the first IP address corresponds to an authorized rights vendor.

3. The method of claim 2 wherein the record includes a customer ID identifying the rights vendor.

4. The method of claim 3 wherein the central repository has a database that stores pairs of customer ID values and wherein step (c) comprises determining with the processor whether the database contains a customer ID value pair that includes the customer ID for the rights vendor and an end customer ID corresponding to the customer ID contained in the keyword.

5. The method of claim 4 wherein step (d) comprises using the processor with the end customer ID to search a license table to identify a list of licensees available to the customer.

6. The method of claim 5 wherein the request for license rights includes a content item ID identifying a content item for which license rights are requested and wherein step (d) further comprises using the processor with the content item ID and the list of available licenses to search a right table to identify the rights the applicable licenses provide for a particular piece of content.

7. The method of claim 1 wherein the central repository contains a plurality of portions, each portion being assigned to a customer ID.

* * * * *